(No Model.)

C. O. DE LAP & E. D. MILLS.
WIRE GATE.

No. 581,539. Patented Apr. 27, 1897.

Witnesses:
Herbert Bradley.
Jas. W. White.

Inventors.
C. O. DeLap.
Eugene D. Mills.
By Knight Bros.
Attys.

UNITED STATES PATENT OFFICE.

CHARLES O. DE LAP AND EUGENE D. MILLS, OF ATCHISON, KANSAS.

WIRE GATE.

SPECIFICATION forming part of Letters Patent No. 581,539, dated April 27, 1897.

Application filed September 28, 1896. Serial No. 607,202. (No model.)

*To all whom it may concern:*

Be it known that we, CHARLES O. DE LAP and EUGENE D. MILLS, citizens of the United States, and residents of Atchison, in the county of Atchison and State of Kansas, have invented certain new and useful Improvements in Wire Gates, of which the following description, taken in connection with the accompanying drawings, is a full, clear, and exact specification.

The objects of our invention are to produce a gate which will be of very light and durable construction, which will not swag or freeze to the ground, which will hang on any incline without leveling the ground, which can always be opened and swung in either direction in passing through and the front or outer end raised to any desired angle in order to pass over high ground or other obstructions, and the safety-latch of which will sustain the outer end of the gate, will allow for expansion and contraction, and will be always ready for manipulation by reason of means employed for preventing displacement of the latch-pin.

Our invention consists in certain novel features of construction whereby the above objects may be attained, as will now be fully described, and then be particularly pointed out in the claims.

Figure 1:
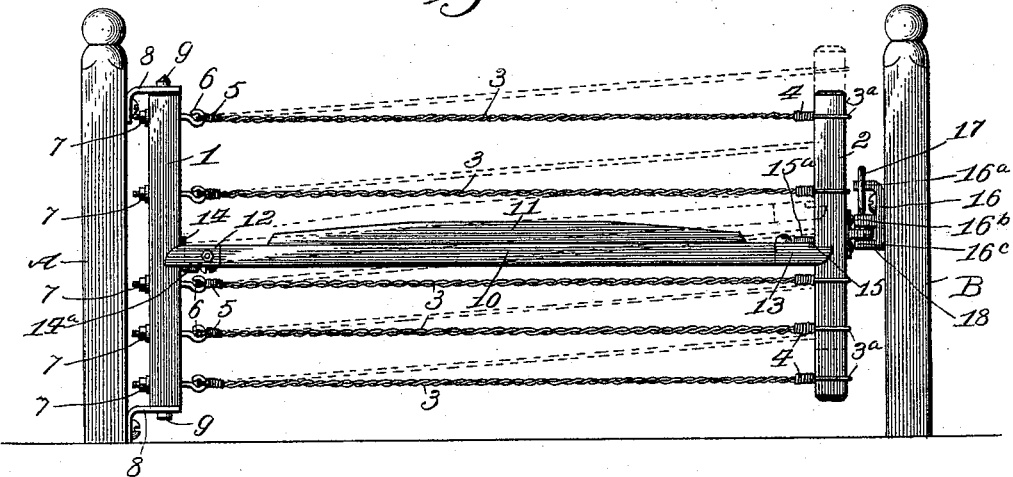
Figure 2:
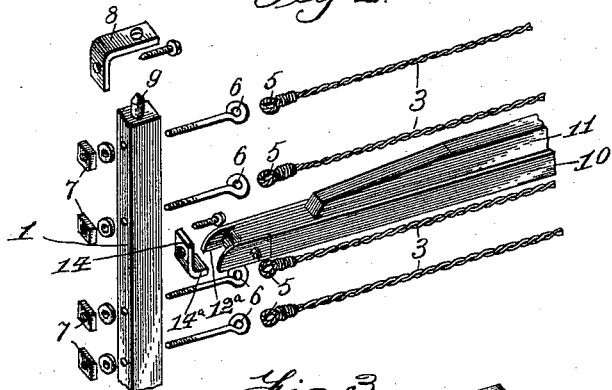
Figure 3:
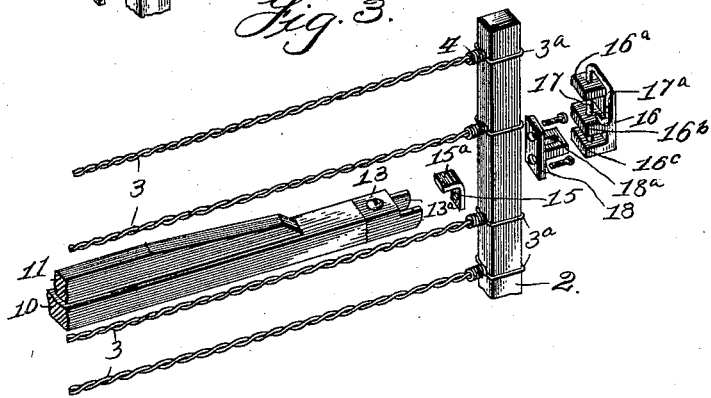

In the said drawings, Figure 1 represents a side elevation of a gate constructed and mounted in accordance with our invention. Fig. 2 is a segregated perspective view of the inner end of the strut and the inner end member, together with the connections and mountings therefor. Fig. 3 is a similar view of the opposite or outer end of the strut and the parts adjacent thereto, including the outer end member and the safety-latch.

A and B represent the two gate-posts.

1 represents the inner end member, and 2 the outer end member, which are connected by the wires 3, each made up of a plurality of strands, preferably two. Each wire has one end passed through a perforation in one end member and there divided, and the constituent strands $3^a$ are brought around the sides of the member and twisted around the main portion of the wire. The opposite end of each wire is formed with a loop 5, engaged by an eyebolt 6, which passes through the opposite end member and is there adjustably secured by means of a nut 7.

8 represents hinging brackets in the perforated horizontal arms of which the trunnions 9 of the gate are mounted.

10 is the spreading strut, which may be provided with a brace 11 and which carries at its ends the bifurcated bearing-shoes 12 13, formed of U shape in cross-section, so as to leave an edge, as shown at $12^a$ $13^a$ in Figs. 2 and 3, to bear against the bearing-plates 14 15, mounted upon the respective end members 1 2. These bearing-plates have horizontal projections $14^a$ $15^a$, projecting, respectively, beneath the strut on the inner end member and above said strut on the outer or swinging end member. By this means the strut is free to vary its angle with the end members so far as is necessary in raising the outer end of the gate, but flexure of these angles in the opposite direction, such as would take place in sagging of the outer end of the gate, is prevented. Furthermore, it will be observed from Figs. 2 and 3 that the U-shaped bifurcated bearing-shoes 12 and 13 are in reverse positions on the opposite ends of the strut, in order that their bearing ends $12^a$ $13^a$ may impinge closely upon the angles of the bearing-plates to better perform the functions just described with reference to said plates.

16 represents the locking-plate of the safety-latch, and this plate has projections $16^a$ $16^b$ $16^c$, perforated for the reception of a locking-pin 17. The pin 17 has its upper end curved down, as shown at $17^a$ in Fig. 3, and engaged beneath the latch-plate in order that said pin may not be entirely withdrawn, and thus lost.

18 represents the locking-tongue carried by the outer end member of the gate and having an elongated opening $18^a$, in which the pin 17 engages, such elongation being for the purpose of permitting the expansion and contraction of the gate as a whole to take place without binding the latch.

From the foregoing description it will be observed that we have produced a gate well adapted for carrying out the several objects enumerated and that the same is of very economical construction and easy of manipulation.

Having thus described our invention, the following is what we claim as new therein and desire to secure by Letters Patent:

1. A gate comprising the end members, the tension-wires, the spreading strut bearing at its respective ends against the end members, and the projections projecting respectively beneath the inner end and above the outer end of the strut, to prevent its sagging, while permitting free upward inclination, substantially as herein explained.

2. In a gate, the combination of the two end members, the wires connecting said end members, the strut for stretching the wires and spacing the end members apart, the forked bearing-shoes on the ends of the strut, the angle-plates carried by the respective end members and having their projecting portions beneath the inner end of the strut and above the outer end thereof, in order to permit the gate to be raised, and suitable means for fastening the gate, as explained.

3. In a gate, the combination of the end members, the spreading strut, and the wires, each formed of a plurality of strands, passed through openings in one of the end members, and then divided and brought around the sides of the end member and then twisted upon the main wire, and the other end of each wire being attached to the opposite end member by an adjustable means, substantially as and for the purpose set forth.

4. In combination with a wire gate, constructed to lift at its outer end as shown; the fastening for the swinging or outer end of the gate, consisting of the latch-plate having projections, perforated for the insertion of a pin, and the projecting tongue on the gate adapted to enter between the projections of the latch-plate and having an elongated opening to receive the pin, and permit expansion and contraction of the gate, as herein explained.

CHARLES O. DE LAP.
EUGENE D. MILLS.

In presence of—
W. A. JACKSON,
W. H. EMSLIE.